F. L. ELLIS.
TESTING DEVICE FOR LIQUID EVAPORATORS.
APPLICATION FILED MAR. 12, 1914.
1,148,506.
Patented Aug. 3, 1915.
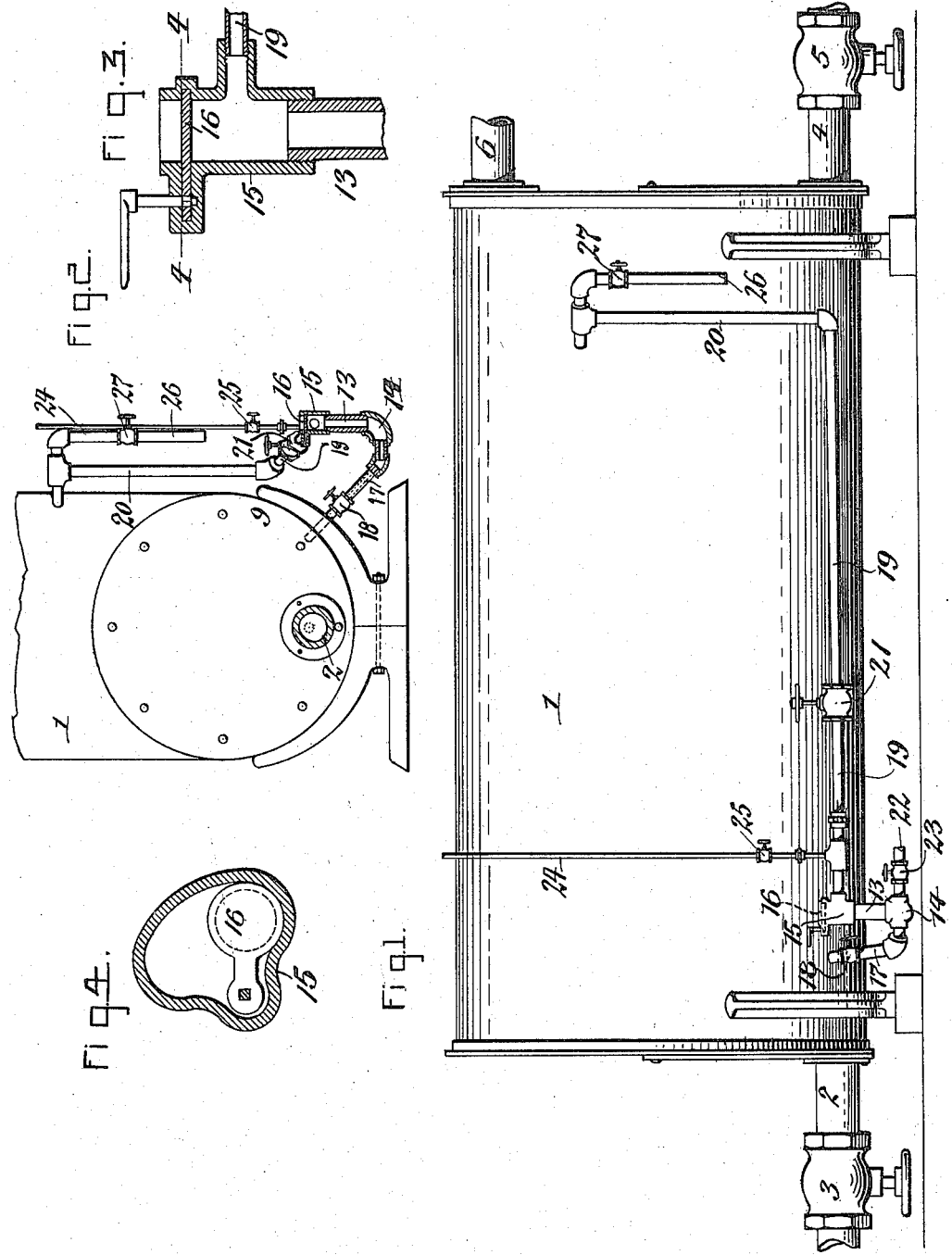
WITNESSES
INVENTOR
Fenwick L. Ellis
by Leyer & Popp
ATTORNEYS

UNITED STATES PATENT OFFICE.

FENWICK L. ELLIS, OF BUFFALO, NEW YORK, ASSIGNOR TO RICHARD E. GAVIN, OF BUFFALO, NEW YORK.

TESTING DEVICE FOR LIQUID-EVAPORATORS.

1,148,506.     Specification of Letters Patent.     Patented Aug. 3, 1915.

Application filed March 12, 1914.   Serial No. 824,191.

*To all whom it may concern:*

Be it known that I, FENWICK L. ELLIS, a citizen of the United States, residing at Buffalo, in the county of Erie and State of New York, have invented new and useful Improvements in Testing Devices for Liquid-Evaporators, of which the following is a specification.

This invention relates to a testing device which is more particularly designed for use in connection with evaporators whereby liquids containing more or less solid matter are thickened or rendered more dense, such for instance, as the evaporators which are used for removing excess or surplus moisture from liquids in treating sugar, salt and tanning liquids, or in treating by-products in various industrial establishments, such as liquids derived from garbage in rendering works or from fish in fish factories. Heretofore it has been customary to test the density or temperature of the liquid under treatment in evaporators of this character by closing down or stopping the evaporator for a time and allowing the vacuum to dissipate or stop its function and then pump off a sample of the liquid for testing purposes. This is objectionable not only on account of the necessity of handling the liquid but it also interrupts the operation of the evaporator and thereby cuts down the capacity of the same and also requires considerable time on the part of the attendant for making a test of the liquid.

It is the object of this invention to provide a testing device for such evaporators, which is so constructed that it permits of making a test for density, temperature or other purposes of the liquid under treatment or drawing a sample of same without necessitating handling it and in such manner that the operation of the evaporator need not be interrupted for this purpose.

In the accompanying drawings:—Figure 1 is a side elevation of a liquid evaporator equipped with my improved testing device. Fig. 2 is a fragmentary vertical transverse section of the same. Fig. 3 is a vertical section, on an enlarged scale of the upper part of the column and the closure for the testing opening in the same. Fig. 4 is a horizontal section in line 4—4, Fig. 3.

Similar characters of reference indicate corresponding parts in both views.

My improved testing device may be applied to evaporators which may be variously constructed, that shown in the drawings, for example, comprising an evaporating chamber or tank 1, a liquid inlet or supply pipe 2 preferably connected with the lower part of the chamber at one end thereof and provided with a hand valve 3, a liquid delivery pipe 4 connected with the lower part of the evaporating chamber at the opposite end thereof and provided with a hand valve 5, and a vapor outlet pipe 6 which connects the upper part of the evaporating chamber with an exhaust device of any suitable or well known character for producing a vacuum within the evaporating chamber. While the liquid is within the evaporating drum the same may be heated and agitated if desired by any suitable means.

In its preferred form my improved liquid testing device which is used in connection with the evaporator is constructed as follows: Adjacent to the outer side of the evaporating chamber is arranged an upright column or receptacle which in the form shown in the drawings is composed of an upright or stand pipe 13, a lower T or three-way fitting 14 connected with the lower end of the upright pipe, an upper T 15 connected with the upper end of the stand pipe 13 and a gate valve or closure 16 which closes the upper end of the upper T. This receptacle or column is preferably of sufficiently large diameter to permit of holding a suitable quantity of liquid and also to enable a Baumé scale and thermometer to be inserted into the liquid and removed therefrom through the upper end of the column while the closure 16 is open. The lower end of this column is connected with the interior of the evaporating chamber below the normal level of the liquid therein, preferably by a reduced lower leading pipe 17 extending from the lower T 14 at the lower end of the column to the underside of the evaporating chamber and containing a hand valve 18, whereby this reduced pipe may be opened or closed. The column is also connected at its upper end with the evaporating chamber above the normal liquid level therein preferably by means of a reduced upper leading pipe composed of a lower section 19 connected with the T 15 and an upper section 20 connected with the upper part of the evaporating chamber above the liquid level therein. The lower section of the upper leading pipe preferably rises gradually from the T 15 to the lower end of the upper section 20 and is provided with a hand valve 21 for opening or closing this pipe, said hand valve being so located that the level of the liquid in the adjacent portion of the lower pipe section 19 is as high but no higher than the upper end of the column.

During the normal operation of the machine the valves 18, 21 are both closed and the piping between the same is empty. When it is desired to make a test of the liquid within the evaporating chamber the valves 18, 21 are both opened, thereby permitting a portion of the liquid to flow from the evaporating chamber through the lower leading pipe into the column and from the latter into the upper leading pipe until the liquid reaches a point in the latter on a level with the liquid in the evaporating chamber. The valves 18, 21 are now closed, whereby a portion of the liquid is cut off from the liquid in the evaporating chamber, this cut-off portion being trapped between the valves 18, 21 and uninfluenced by the vacuum within the chamber. Upon now opening the closure 16 at the top of the column the attendant may place a hydrometer, such as a Baumé scale, or thermometer, into the liquid within the column or receptacle for the purpose of testing the same. By inclining the lower section of the upper leading pipe upwardly from the column to the valve 21 the liquid within the lower pipe section 19 between the valve 21 and the column is free to flow back into the column for substantially filling the same but without liability of overflowing the column inasmuch as the upper end of the latter is at least as high as that portion of the pipe section 19 adjacent to the hand valve 21. It will thus be manifest that a test of the liquid as to its density can be made by the attendant without handling any portion of the liquid for this purpose. After the test has been made the valves 18, 21 are opened so that the liquid within the column and connecting passages may be again drawn into the evaporating chamber by the suction of the vacuum therein. The attendant then closes the valves 18 and 21 and the upper end of the column by the gate valve 16. It will thus be apparent that a test of the liquid can by this means be made without stopping the operation of the machine, thereby effecting a saving in time and increasing the output of the machine.

In case it is desired to draw off a sample of the liquid this can be done while the machine is running by means of a branch discharge pipe 22 which may be connected with the T 14, as shown in Fig. 1, or any other suitable conduit leading from the lower end of the column or receptacle of the tester, said pipe being provided with a hand valve 23 for opening and closing the same.

For convenience in cleaning the piping or passages of the testing device, steam under pressure is admitted to the same preferably through a pipe 24 which is connected with the lower section 19 of the upper leading pipe between the column and the valve 21 and which is provided with a hand valve 25. Upon opening the valve 25 and then alternately valves 21 and 18, any sediment or other accumulations in the piping of the testing device is blown out of the same and into the evaporating chamber, after which these valves are closed.

For convenience in lowering the vacuum within the evaporating chamber or the admitting of any liquid therein a branch pipe 26 is provided which preferably connects with the upper section 20 of the upper leading pipe and which is provided with a hand valve 27 whereby the same may be opened and closed. When the valve 27 is opened the interior of the evaporating chamber is connected with the atmosphere so as to admit air or to suck into the evaporating chamber any desired liquid so held that the opening of the pipe 26 is immersed in it, but during the normal operation of the machine this valve is closed so as to maintain the vacuum in the evaporating chamber.

I claim as my invention:

1. The combination of a liquid evaporating chamber, and a liquid testing device comprising a conduit connected at its opposite ends with said chamber above and below the normal liquid level therein and provided with a testing opening, a closure for the testing opening, and valves arranged in said conduit on opposite sides of said testing opening.

2. The combination of a liquid evaporating chamber, and a liquid testing device comprising a conduit having an upright receptacle or column provided at its upper end with a testing opening, a lower leading pipe connecting the lower end of the column with said chamber below the normal liquid level therein, an upper leading pipe connecting the upper part of said column with said chamber above the normal liquid level, valves arranged in said leading pipes, and a closure for said testing opening.

3. The combination of a liquid evaporating chamber, and a liquid testing device comprising a conduit having an upright receptacle or column provided at its upper end with a testing opening, a lower leading pipe connecting the lower end of the column with said chamber below the liquid level therein, an upper leading pipe connecting the upper part of said column with said chamber above the liquid level, valves arranged in said leading pipes, and a closure for said testing opening, said upper leading pipe having a section which is inclined and rises gradually from the column and that part of the leading pipe adjacent the valve therein being no higher than the upper end of said column.

4. The combination of a liquid evaporating chamber, and a liquid testing device comprising a conduit having an upright receptacle or column provided at its upper end with a testing opening, a lower leading pipe connecting the lower end of the column with said chamber below the liquid level therein, an upper leading pipe connecting the upper part of said column with said chamber above the liquid level, valves arranged in said leading pipes, a closure for said testing opening, and a branch pipe connected with the lower end of the column and opening to the atmosphere and containing a valve.

5. The combination of a liquid evaporating chamber, and a liquid testing device comprising a conduit having an upright receptacle or column provided at its upper end with a testing opening, a lower leading pipe connecting the lower end of the column with said chamber below the liquid level therein, an upper leading pipe connecting the upper part of said column with said chamber above the liquid level, valves arranged in said leading pipes, a closure for said testing opening and a steam pipe connected with said conduit at a point between the valves in said leading pipes and provided with a valve.

Witness my hand this 3rd day of March, 1914.

FENWICK L. ELLIS.

Witnesses:
E. M. GRAHAM,
ANA HEIGIS.